United States Patent [19]

Byrnes, Jr.

[11] Patent Number: 4,882,948
[45] Date of Patent: Nov. 28, 1989

[54] SPEED CONTROL ASSEMBLY FOR NUTATING CONE TRANSMISSION

[76] Inventor: Raymond A. Byrnes, Jr., 1064 Omar Dr., Crownsville, Md. 21032

[21] Appl. No.: 125,934

[22] Filed: Nov. 30, 1987

Related U.S. Application Data

[63] Continuation-in-part of Ser. No. 59,406, Jun. 8, 1987, abandoned.

[51] Int. Cl.⁴ .................. F16H 37/06; F16H 15/20
[52] U.S. Cl. ............................ 74/690; 74/191
[58] Field of Search .............. 74/190, 190.5, 191, 74/690

[56] References Cited

U.S. PATENT DOCUMENTS

| | | | |
|---|---|---|---|
| 2,080,152 | 5/1937 | Schmitter | 74/690 |
| 2,178,859 | 11/1939 | Jett et al. | 74/690 |
| 2,209,023 | 7/1940 | Jett | 74/690 |
| 2,642,749 | 6/1953 | Wood | 74/191 |
| 4,152,945 | 5/1979 | Kemper | 74/191 |
| 4,233,851 | 11/1980 | Kemper | 74/191 |
| 4,233,859 | 11/1980 | Kemper | 74/690 |
| 4,235,127 | 11/1980 | Kemper | 74/796 |
| 4,238,976 | 12/1980 | Kemper | 74/690 X |
| 4,258,581 | 3/1981 | Kemper et al. | 74/192 |
| 4,267,749 | 5/1981 | Chambers et al. | 74/690 |
| 4,277,982 | 7/1981 | Kemper | 74/191 |
| 4,282,947 | 8/1981 | Kemper | 180/165 |
| 4,296,647 | 10/1981 | Kemper | 74/690 |
| 4,369,667 | 1/1983 | Kemper | 74/191 |
| 4,378,708 | 4/1983 | Pouliot | 74/191 |
| 4,495,829 | 1/1985 | Kemper | 74/690 X |
| 4,559,841 | 12/1985 | Chambers | 74/191 |
| 4,572,015 | 2/1986 | Kemper | 74/191 |

OTHER PUBLICATIONS

Raia, Ernest, "Continuously Variable Transmissions", High Technology, Jul., 1984, pp. 65–71.

Primary Examiner—Dwight G. Diehl
Attorney, Agent, or Firm—Laubscher, Presta & Laubscher

[57] ABSTRACT

A nutating cone transmission is characterized by a flexible speed control ring for controlling the rotational speed of the cone about its axis. The ring is mounted adjacent to the cone with a portion thereof in contact with and depressed by the surface of the cone. A displacement mechanism laterally displaces the ring relative to the cone while preventing rotational movement of the ring and slippage between the ring and the cone. The position of the ring relative to the diameter of the cone controls the rotational speed of the cone which is delivered to an output. The flexible speed control ring increases the reliability and efficiency of the transmission by eliminating slippage between the ring and damage to the cone through wear.

5 Claims, 3 Drawing Sheets

SPEED CONTROL ASSEMBLY FOR NUTATING CONE TRANSMISSION

This application is a continuation-in-part of application Ser. No. 059,406 filed June 8, 1987 now abandoned.

BACKGROUND OF THE INVENTION

The present invention relates to an improved speed control assembly, and especially to improved flexible speed control rings, for a nutating cone transmission. The flexible rings enable smooth shifting of the transmission without any slippage or sliding between the nutating cone and the speed control rings.

BRIEF DESCRIPTION OF THE PRIOR ART

The nutating cone transmission was developed by Vadetec Corporation during the 1970's, and Vadetec has obtained a number of U.S. patents on the transmission or various features thereof, examples of which include:

| | |
|---|---|
| 4,152,945 | 4,277,982 |
| 4,233,851 | 4,282,947 |
| 4,233,859 | 4,296,647 |
| 4,235,127 | 4,369,667 |
| 4,238,976 | 4,378,708 |
| 4,258,581 | 4,572,015 |

Basically, the nutating cone transmission includes an input assembly which is driven by an engine. A double cone is mounted within the input assembly at a 20° angle to the assembly axis. As the input assembly rotates, the centers at the opposite ends of the double cone define circles of equal diameter, i.e. nutations. The cone assembly rolls around a set of rigid, annular speed control rings that are free to move axially along a stationary housing. The rate at which the double cone spins is governed by its diameter at the point where it engages the rings. When the rings are close together, at the maximum diameter of the double cones, the maximum output drive speed is produced. Conversely, when the rings are spaced apart at the minimum diameter of the double cones, the minimum drive speed is produced. The end of the rotating cone is geared to an output drive shaft.

While the prior nutating cone transmissions normally operate satisfactorily, they possess inherent drawbacks resulting from the metal to metal contact between the cone and speed control rings. More particularly, there is a tendency for the rings to slip relative to the rotating cone surface as the rings shift laterally along the length of the cone, thereby reducing the efficient transmission of drive to the output. In fact, the non-zero thickness of each ring guarantees a slippage along the left and right edges of the region of contact with the cone. Slippage also results when the transmission is vibrated, such as for example when the vehicle hits a bump in the road or traverses rough terrain. In order to minimize slippage, it is necessary to machine the tolerances between moving parts for a tight fit which increases the cost of manufacture. Particulates which enter the transmission housing may become wedged between the nutating cone surface and the speed control rings and gouge the metal contact surfaces or prevent lateral displacement of the rings relative to the cone. The metal to metal contact of the prior devices also generates undesirable high frequency screeching noises under high torque conditions. A sophisticated transmission cooler is normally required to dissipate the heat generated by the friction between the cone and rings. Furthermore, lubricants are required in order to reduce wear of the moving parts. However, the lubricants must not increase the slippage between the cone and the rings. Moreover, the lubricant must be changed periodically to remove particulates resulting from component wear.

The present invention was developed in order to overcome these and other drawbacks of the prior nutating cone transmissions by providing flexible side-walled no-slip speed control rings which firmly grip the surface of the nutating cone to more accurately govern the rotational speed thereof.

SUMMARY OF THE INVENTION

Accordingly, it is a primary object of the present invention to provide an improved speed control ring assembly for a nutating cone transmission. The speed control ring assembly includes a flexible speed control ring which controls the rotational speed of the cone about its axis in response to the nutational drive of the cone imparted by a driven input assembly. A ring mount is provided for mounting the speed control ring adjacent to the cone. The radius of the ring is unequal to the distance between the outer surface of the cone and the axis of rotation of the input assembly, whereby a portion of the ring will be in contact with and depressed by the surface of the cone during nutational drive of the cone. A ring mount displacement control mechanism is connected with the ring mount to laterally displace the speed control ring relative to the cone in a direction parallel with the axis of rotation of the input assembly while preventing rotational movement of the ring and slippage between the ring and the cone. When the ring is displaced toward the vertex of the cone, the rotational speed of the cone increases along with the ratio of the radius of the ring to the radius of the conic circle of contact. Conversely, when the ring is displaced toward the base of the cone, the speed of rotation of the cone decreases again along with the ratio of the radius of the ring to the radius of the conic circle of contact.

According to a more specific object of the invention, the flexible speed control ring is formed of a synthetic rubber material and has the configuration of a reversely folded tire mounted about the cone. The inner surface of the tire contacts the cone with a tractive force and preferably has a tread design comprising a plurality of parallel transverse bars which yieldably grip the cone surface when in contact therewith.

According to yet another object of the invention, the ring mount has the configuration of an annular wheel rim, with the tire-like speed control ring being mounted on the inner surface thereof.

It is a further object of the invention to provide a pressurized gas supply connected with the ring mount for controlling the air pressure within the flexible tire-like ring. Pressure within the ring assists the return of the ring to its normal, undeflected configuration when the ring is out of contact with the cone. Variations in pressure within the ring also vary the traction of the ring relative to the cone.

According to an alternate embodiment of the invention, the flexible speed control ring has the configuration of a conventional tire which is mounted adjacent to the cone, with a portion of the outer tire surface being in contiguous engagement with the cone during nutation thereof.

BRIEF DESCRIPTION OF THE FIGURES

Other objects and advantages of the invention will become apparent from a study of the following specification when viewed in the light of the accompanying drawing, in which.

DETAILED DESCRIPTION

The improved nutating cone transmission having flexible speed control rings according to the invention will be described first with reference to FIG. 1. As shown therein, an axle 2 of a cone 4 has its opposite ends connected with first and second input drive assemblies 6, 8. The first input drive assembly 6 includes a crank arm 10 and a bearing 12 and the second input drive assembly 8 also includes a crank arm 14 and a bearing 16. The crank arms 10, 14 are driven by a motor 18 for rotation about an axis A—A at the same speed and in the same direction. Owing to the arrangement of the crank arms and the bearings, the cone axle 2 and cone 4 are not driven for rotation about the cone axis B—B but are free to rotate within the bearings. Thus, the ends of the axles are driven through circles about the axis A—A to establish the nutational movement of the cone. Furthermore, the bearings 12, 16 will always be separated by 180° in their common circular motion.

The axis B—B of the cone axle 2 is offset from the axis A—A of the input drive crank arms by an angle $\theta_{AB}$. By design, this angle is equal to the angle $\theta_{BC}$ between the surface of the cone and the cone axis, whereby the line C—C along the outermost edge of the cone is parallel to the axis A—A of the input drive crank arms. Typically, $$\theta_{AB} = \theta_{BC} = 20°.$$

Observe that, for the present design of a speed control ring, advantages in implementation might in fact accrue from the choice that instead $\theta_{AB} > \theta_{BC}$. However, for the sake of illustration of the concept and for ease of understanding, equality of the two angles is being assumed.

A flexible speed control ring 20 is mounted about the cone 4 by a ring mounting assembly 22. The speed control ring 20 has an axis which is colinear with the axis A—A of the crank arms. The inner radius of the ring is somewhat smaller than the distance R from the cone outer edge (i.e. line C—C) to the crank arm rotational axis A—A, whereby the cone presses firmly into the inside of the ring as the crank arms rotate.

The speed control ring 20 has the configuration of a reversely folded tire which is mounted in a conventional manner on the inner, rather than on the outer surface of an annular wheel-like ring mount 22. In this manner, the inner surface of the ring is that which contacts the side wall surface of the cone. The flexible ring is preferably formed of a synthetic rubber material and has a tread design comprising a plurality of parallel bars arranged transversely of the inner circumference of the ring.

Figure 1:
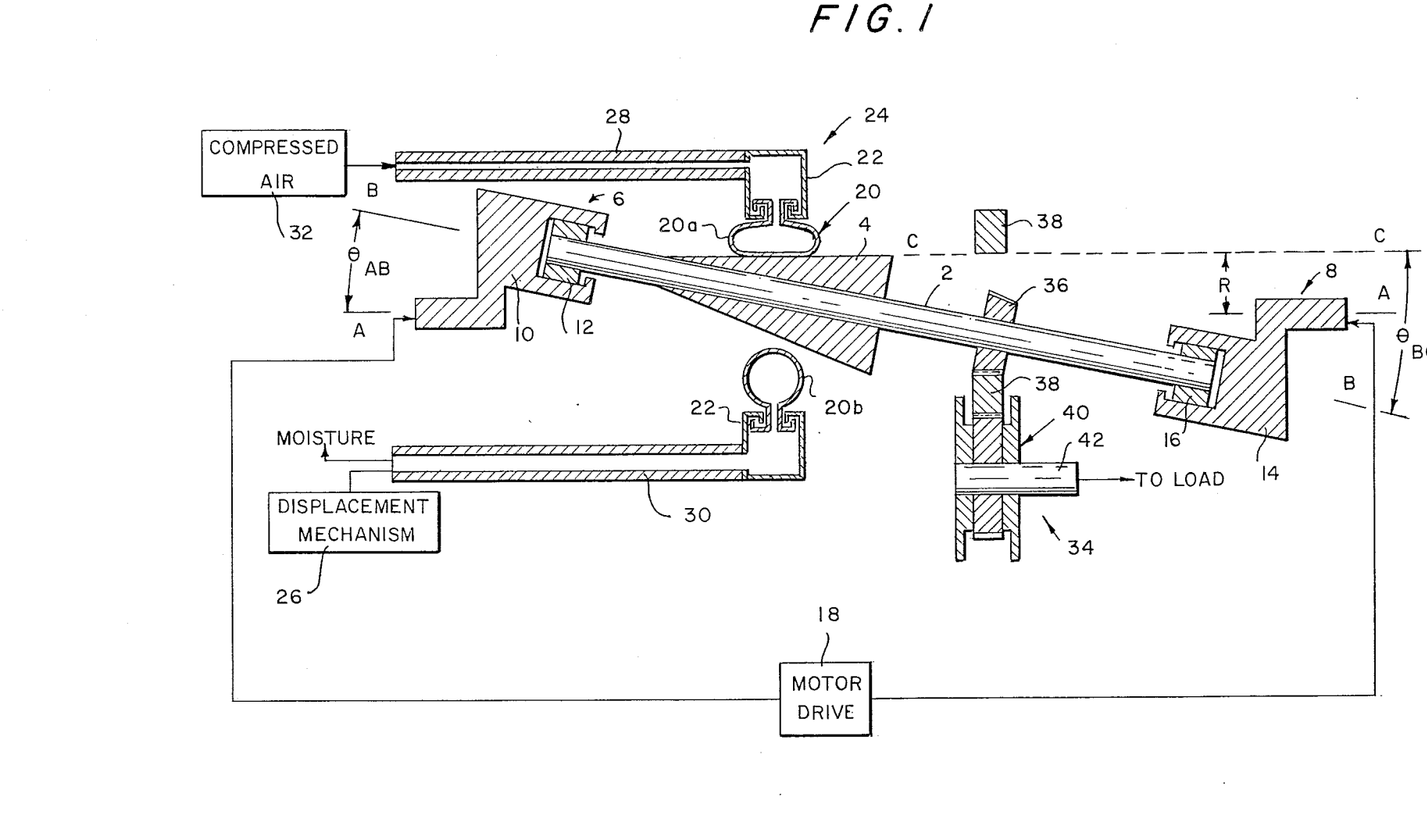
FIG. 1 is a front sectional view of a nutating cone transmission including the improved flexible speed control ring according to the invention.

As shown in FIG. 1, the portion of the ring 20a in contact with the cone surface is depressed or deflected owing to the fact that the cone is angularly arranged relative to the ring axis, while the ring portion 20b not in contact with the cone surface has a normal configuration.

A displacement mechanism 26 is connected with the ring mount 22 for laterally displacing the speed control ring mount and ring assembly 24 relative to the cone.

The ring mount 22 and ring, though laterally displaceable, do not rotate about the axis A—A. Thus as the cone nutates as a result of the rotation of the crank arms 10, 14, the cone is driven for rotation about its axis B—B by the stationary ring. The greater the radius of the circle about the cone which contacts the ring, the lesser the speed of rotation of the cone about its axis, with the nutation remaining constant. Thus by laterally positioning the ring relative to the cone, the speed of rotation of the cone about its axis B—B is controlled.

The ring mount 22 includes a pair of rigid tubes 28, 30 communicating with the interior thereof. The tube 28 is connected with a source of compressed gas or air 32, while the tube 30 enables moisture or other condensation to be removed from the interior of the ring mount and ring. By controlling the source of compressed air 32, the pressure within the tire-like ring may be controlled. Pressurizing the inner portion of the speed control ring serves two significant purposes: (1) it increases the traction of the ring on the surface of the nutating cone especially as the ring becomes worn; and (2) it assists the ring in returning to its normal configuration as shown by the portion 20b as the cone leaves contact with that portion of the ring. By making the tubes 28, 30 of sufficient strength and rigidity, these can also serve the dual purpose of connector rods to the displacement mechanism 26. This latter mechanism is intended to control the lateral position of the complete speed control ring assembly 24.

Rotation of the cone 4 about its axis B—B is used to drive an output assembly 34 to drive a load. More particularly, a tapered gear 36 connected for rotation with the cone axle 2 meshes with a ring gear 38 which in turn meshes with a flanged gear 40 of the output assembly. Rotation of the flanged gear rotates an output shaft 42 which is connected with the load. Not shown in FIG. 1 are two additional flanged gear assemblies, each a replication of assembly 34. The three assemblies are spaced at 120° intervals around the ring gear 38, thus restricting the motion of the ring gear to rotation centered about line A—A.

An explanation of the basic operation of the system shown in FIG. 1 will be facilitated by applying a cartesian coordinate system thereto where the x-axis corresponds with the crank axis A—A, the y-axis is normal to the x-axis and passes through the vertex of the cone and the z-axis intercepts the x and y axes and is arranged normal thereto.

Thus, the vertex of the cone 4 will always lie in the plane of points with x-coordinate equal to zero (i.e., the plane determined by the y-axis and z-axis). In fact, the vertex traces out a figure in that plane which is a circle of radius R centered at the origin, where R is the distance between lines A—A and C—C.

The following idealizations are used below to simplify the presentation.

(i) The speed control ring 20 shown in FIG. 1 is replaced by an ideal unit of zero thickness, such as is rigid and hence contacts the cone at exactly one point.

(ii) The tapered gear 36 is taken to be of negligible thickness.

(iii) The teeth of the tapered gear and as well the internal teeth of the ring gear 38 are assumed to be of differential size.

In particular, idealizations (ii) and (iii) remove all ambiguity about the radius r of the tapered gear and about the internal radius of the ring gear. That internal radius is supposed to have the same value R set forth above.

The axial rotation of the cone/cone axle assembly varies with the nutation rate and the position of the speed control ring as follows.

$$\omega_1 = \nu \cdot \left( \cos(\theta) - \frac{R}{x_s \cdot \sin(\theta)} \right) \quad (1)$$

where
$\omega_1$ = cone axial rotation rate;
$\nu$ = nutation rate;

$\theta = \theta_{BC}$
= half-angle of the cone;

and
$x_s$ = x-axis coordinate of the idealized speed control ring.

This equation is obtained as follows. For definiteness, assume that the cone is at the top of its nutational motion, as shown in FIG. 1. Now pass a plane through the unique point of contact between the surface of the cone and the idealized speed control ring. Note that the point in question has coordinates $(x_s, R, 0)$. Also, let that plane be perpendicular to the center axis, line B—B, of the cone/cone axle assembly. The plane intersects the cone/cone axle assembly in a circular disk. Next, compute the absolute velocity of the point $(x_s, R, 0)$ on that disk in two ways. The first way is to take the sum of the relative velocity with respect to the center point of the circular disk and the absolute velocity of that center point. The relative velocity in question is of the magnitude $\omega_1 \cdot x_s \cdot \sin(\theta)$ and of direction along the positive z-axis. This magnitude is just the product of the rotational rate of the circular disk about its center point and of the radius of the disk. The absolute velocity of the center point of the disk is of magnitude $\nu \cdot (R - x_s \cdot \cos(\theta) \cdot \sin(\theta))$ and again of direction along the positive z-axis. Again, the magnitude is just the product of the appropriate rotation rate (in particular, the rate of rotation about line A—A, alias the nutation rate) and of the appropriate radius (in particular, the distance between the center point of the circular disk and the line A—A). Because the two velocities are in the same direction, the above two indented quantities can be added directly to get the speed of the point $(x_s, R, 0)$ on the circular disk. The second way to compute that speed is to observe that the point on the circular disk in question is the non-skid point of contact with the stationary speed control ring, so that the speed must be zero.

The rotation rate of the ring gear varies with the nutation rate and axial rotation rate of the cone/cone axle assembly as follows.

$$\omega_2 \cdot R = \omega_1 \cdot r + \omega \cdot (R - r \cdot \cos(\theta)) \quad (2)$$

where
r = radius of the tapered gear,
$\omega_2$ = rotation rate of the ring gear
and the rest of the quantities are as noted with equation (1) above. The present equation shows two computations of the speed of the point of contact between the tapered gear and the inner surface of the ring gear. On the left side of the equation is the product of the rotation rate of the ring gear with its internal radius. On the right side of the equation is a bipartite resolution of the speed of the point of contact on the tapered gear, after the fashion of the derivation of equation (1) above. In particular, the first summand on the right side is the relative speed of the point of contact with respect to the center of the tapered gear. The second summand is the speed of the center of the tapered gear. Note that all velocities pertaining to the present equation turn out to be in the negative z-axis direction. However, it is once again only the commonality of the direction that is pertinent, because this permits the speeds to be added and compared directly.

Substitution of equation (1) into equation (2) now gives the fundamental transmission equation for the assembly of FIG. 1.

$$\tau = 1 - \frac{r}{x_s \cdot \sin(\theta)} \quad (3)$$

where
$\tau = \omega_2/\nu$
= ratio of ring gear rotation rate to nutation rate

There are two important characteristics of equation (3). The first is the inverse dependence of the transmission ratio on the position of the speed control ring. This type of dependence should persist when the idealization of zero thickness of the speed control ring is dropped. The second is the fact that $\tau$ can be positive, zero or negative. In fact, FIG. 1 illustrates the selection $\tau = 0$ (i.e., the park setting of the transmission). This is insured because the tapered gear was obtained as the symmetric reflection of the portion of the cone contacting the portion 20a of the ring.

Figures 2A, 2B, 2C, 3:
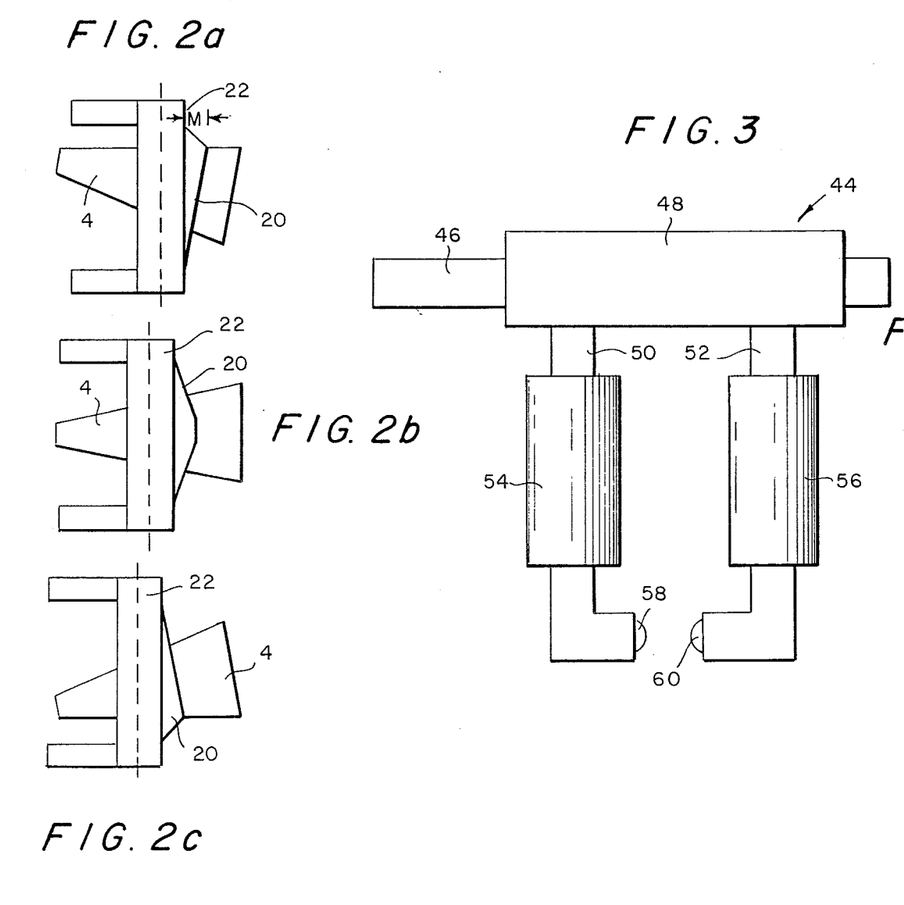
FIGS. 2a-2c are front plan views illustrating the side deflection of the flexible ring as the ring mount is laterally displaced relative to the nutating cone.
FIG. 3 is a front plan view of a pincer assembly for assisting the flexible ring in its return to its normal configuration.

The success of the flexible speed control ring according to the invention rests in the mechanics of its lateral repositioning on the surface of the cone. FIGS. 2a-2c illustrate the mechanics for displacement of the ring to the left toward the vertex of the nutating cone. In order to explain the mechanics, it is necessary to assume that (1) the sidewalls of the flexible ring are sufficiently flexible, with respect to lateral motion, that the portion of the tread opposite the cone can be close to being centered on the ring mount even though the tread in contact with the cone is significantly to the right of ring mount center; and (2) the nutation rate of the cone is slow enough that the portion of the tread opposite the cone has enough time to return as close to ring mount center as it would ever be (i.e., as close as if the cone were to stop moving).

The leftward repositioning of the speed control ring will proceed as shown in FIGS. 2a-2b. In FIG. 2a, the cone is at the top of its nutational motion, and the combination of ring traction on the cone with leftward movement by the displacement control 26 results in a significant protrusion M of the top tread to the right of the ring. In FIG. 2(b), as the cone continues to the forward position of its nutation, it contacts a portion of ring tread which is not as far to the right as was the contact point in FIG. 2(a). At the same time, steady leftward force on the ring mount results in a rightward protrusion of the newly contacted tread portion by the same amount M off center. This results in a slight leftward advance of the mount. An equal advance will again occur as the cone next moves to the bottom of its nutation, as shown in FIG. 2(c). In fact, if m denotes the minimum rightward protrusion of the tread (opposite the cone), one now sees the shift rate as being $$\sigma = 2 \cdot (M - m) \cdot \nu \qquad (4)$$

where, as above, $\nu$ denotes the nutation rate of the cone.

Of interest in the present discussion are the mechanics whereby the air pressure tends to center the tread of the ring with respect to the ring mount. Refer now to FIG. 1. At any point inside the portion 20b, the air pressure component at that point, which is normal to the inside surface, can be resolved into vertical and horizontal components. In spite of the fact that the horizontal component is definitely the sidewise push, it actually does not contribute to the centering of the tread relative to sidewise motion. The reason is the cancellation by the horizontal air pressure component of equal magnitude but opposite direction at the symmetric point across the center of the ring. Rather, it is the array of vertical air pressure components under the tread that keeps the ring centered. For example, a displacement of that tread section to the right would result in an imbalance of the torque arms of those vertical components. The counterclockwise torque arm about the lip of the left sidewall would be increased for each vertical component, whereas the clockwise torque arm about the lip of the right sidewall would be decreased. The result would be a net counterclockwise torque tending to turn the sidewalls straight and to re-center the tread.

Compare now the effects of the air pressure on the depressed portion 20a of the ring. There the vertical components of the air pressure under tread are cancelled by the impression made by the cone. In other words, the air pressure has no centering action on this portion of the ring. Thus, the mechanics of the present design offer a factor which, even at high air pressures for high traction, tends to mitigate the effort needed to produce the lateral re-positioning of the speed control ring.

Referring now to FIG. 3, there is shown a roller pincer device 44 to mechanically assist the return of the ring to its normal configuration when out of contact with the cone. Such a mechanism is suggested as an option so that acceptable shift (i.e., lateral displacement) rates can be achieved even at high nutation rates. The roller pincer device includes a keyed mounting shaft 46 which is secured to the first crank arm 10 as shown in FIG. 1 at a point diametrically opposite the bearing 12, whereby as the cone nutates, the device 44 will orbit at the same rate by 180° out of phase with the cone.

A sleeve 48 is mounted on the shaft 46 and is able to slide laterally therealong. Owing to the keyed configuration of the shaft, however, the sleeve is prevented from rotating relative thereto. A pair of pincer arms 50, 52 are connected with the sleeve and have roller cylinders 54, 56 rotatably connected therewith. Roller balls 58, 60 are mounted in the inwardly facing ends of the arms, respectively. The roller balls are adapted to ride on the outside of the mounting rim of the ring mount. Accordingly, the roller pincer 44 moves laterally in unison with the ring mount. Simultaneously, the roller cylinders 54, 56 graze the outer sidewalls of the flexible ring, whereby lateral motion of the sub-assembly encourages the sidewalls of the ring to retain their normal configuration.

Figure 4:
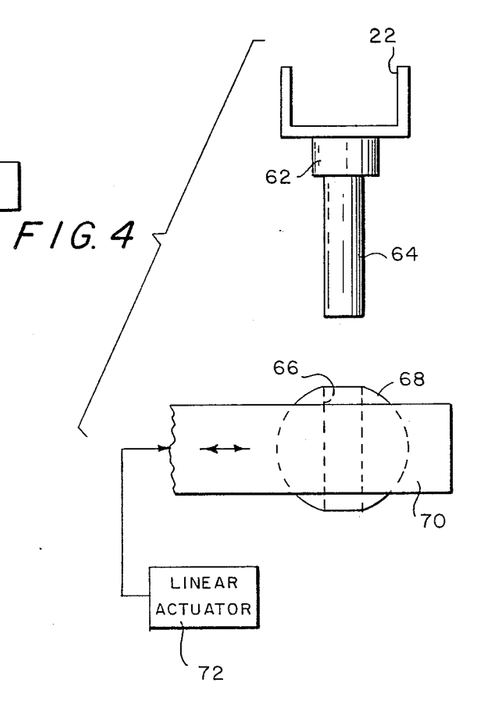
FIG. 4 is an exploded view of an alternative ring mount intended to achieve a wobbling motion such as will enhance the displacement action shown in FIGS. 2a-2c.

In certain situations, such as for example when the air pressure within the ring or the rate of nutation is sufficiently high, as an alternative to the roller pincer mechanism 44 described with reference to FIG. 3, it may be desirable to assist the ring in its lateral movement by rocking or wobbling the ring mount in the direction of displacement. This can be done by attaching lateral re-positioning rods to the ring mount using pivot joints as illustrated in FIG. 4.

More particularly, a spacing collar 62 is connected with the wheel 22 and a stub axle 64 extends radially therefrom. The stub axle is adapted for insertion into an opening 66 contained in a roller ball 68 mounted for rotation within a lateral positioning rod 70. Lateral movement of the positioning rod is controlled by a linear actuator 72. Although only one positioning rod is illustrated in FIG. 4, there are preferably three such rods and assemblies, each with its own linear actuator, arcuately spaced at 120° intervals about the wheel 22. Since the lateral positioning rods replace the rigid pneumatic tubes 28, 30, flexible hoses (not shown) must be connected with the wheel 22 to supply compressed air to the interior of the ring (also not shown) and to remove condensation therefrom.

In order to achieve a wobbling motion of the ring, the three linear actuators are stepped sequentially. Specifically, a given linear actuator should be advanced by an appropriate step increment in the desired lateral direction when the cone is detected (optoelectronically or otherwise) to be diametrically opposite that linear actuator/positioning rod combination. Through a turning action of the ball joint, the pivot joint of FIG. 4 will specifically admit the tilting of the ring mount which is intrinsic to this non-simultaneous advance of the actuators/rods.

If the plane of the ring mount is to be tilted by an angle $\phi$ from the vertical, for example, then the vertical height of the ring mount will be reduced by a multiplicative factor of $\cos(\phi)$. However, the three lateral re-positioning rods are at fixed vertical separations and are mounted so as to be capable of exactly one type of motion, that being lateral displacement. Herein lies the reason that the ring mount joins the roller ball via a sliding stub axle rather than a fixed (e.g., welded) connection. When a particular rod is advanced laterally and the other rods are held steady, the height discrepancy factor $\cos(\phi)$ will be overcome automatically by the stub axle sliding outward slightly of the bore through the corresponding roller ball.

This ability of the stub axles to slide out of the roller balls also accounts for the following complication. The radius R of the circular cylinder traced out by by the cone as it nutates is fixed, even if the height of the ring mount is reduced by the factor of $\cos(\phi)$ mentioned above. Automatic compensation for this discrepancy occurs in that the stub axles nearest the cone will remain fully inserted into their respective roller balls, whereas the stub axles farthest away from the cone will slide out by the maximum from their respective roller balls.

Other assemblies (not shown) may also be provided to assist the lateral displacement of the ring assembly. For example, as a less expensive alternative to the use of three independent linear actuators, a solid ring may be connected with the remote ends of the rods using pivot joints exactly as per the speed control ring. Furthermore, a roller, attached via the crank arm to the axle of nutation, may be used to force this auxiliary ring to be pressed into the rods in exactly the same way as the cone presses the speed control ring into the rods. Thus, the auxiliary ring will duplicate exactly the salient features of the motion of the speed control ring. In fact, the sole reason for introducing the auxiliary ring is that the cone does not leave enough room to fit the following mechanism for positioning the auxiliary ring.

Use a system of three pincer rollers which are attached to the legs of a letter "Y" axle configuration (i.e., at uniform 120° intervals). The letter "Y" is to be mounted in a plane perpendicular to the axis of nutation, and is to rotate about its center exactly at the speed of nutation. Two of the pincers should fork the auxiliary ring at 60° removal from the outer edge of the cone, and the remaining pincer should fork the ring at 180° from the outer edge of the cone.

In particular, the letter "Y" axle assembly should be constructed to admit the following deformation. All planes are permanently perpendicular to the axis of nutation. However, the plane containing the two 60° axles is to be separable from the plane containing the 180° axle. This separation can be accomplished by a gear/screw mechanism, in response to an externally applied, purely mechanical signal of one degree of freedom. This will introduce a variable angle tilt in the plane of the auxiliary ring, with the axis of tilt nutating exactly in unison with the nutation of the cone.

Observe that this latter mechanism will not give control of the lateral position of the speed control ring. Instead, it will give control of the rate of change (i.e., time derivative) of that position.

Although the invention has been described for use with a single nutating cone, a biconical device may also be used by adding a second flexible ring mounted and controlled in the same manner as the single ring described above.

The preceding discussion of FIGS. 3 and 4 has addressed a particular aspect of the high speed operation of the embodiment of FIG. 1. Now the discussion will turn to another more fundamental aspect of that embodiment such as arises from considerations of high speed. The aspect in question is that the cone orbits along the inside of the speed control ring 20. This feature is vital for prior nutating cone transmissions having solid speed control rings formed of rigid metals. At high rates of nutation, centrifugal force will act on the cone 4 so as to swing it away from the axis of nutation A—A. This results in a bow-shaped deformation of the cone axle 2. The same action of deflection by centrifugal force will occur in the case of a biconic design, although in that case the cone axle will doubly deform into the shape of a letter "S". Thus, if the cone orbits inside the ring, traction against a solid ring will increase with nutation rate. If instead the cone were designed to orbit outside a solid speed control ring, the deflection of the cone with increasing nutation rate would degrade, and eventually curtail, traction with the ring.

This latter limitation does not persist in the case of flexible speed control rings of the pneumatic type. Once the approach of pneumatically induced traction has been adopted, it is possible to have the cone orbiting externally to the speed control ring as shown in the alternate embodiment of FIG. 5.

Figure 5:
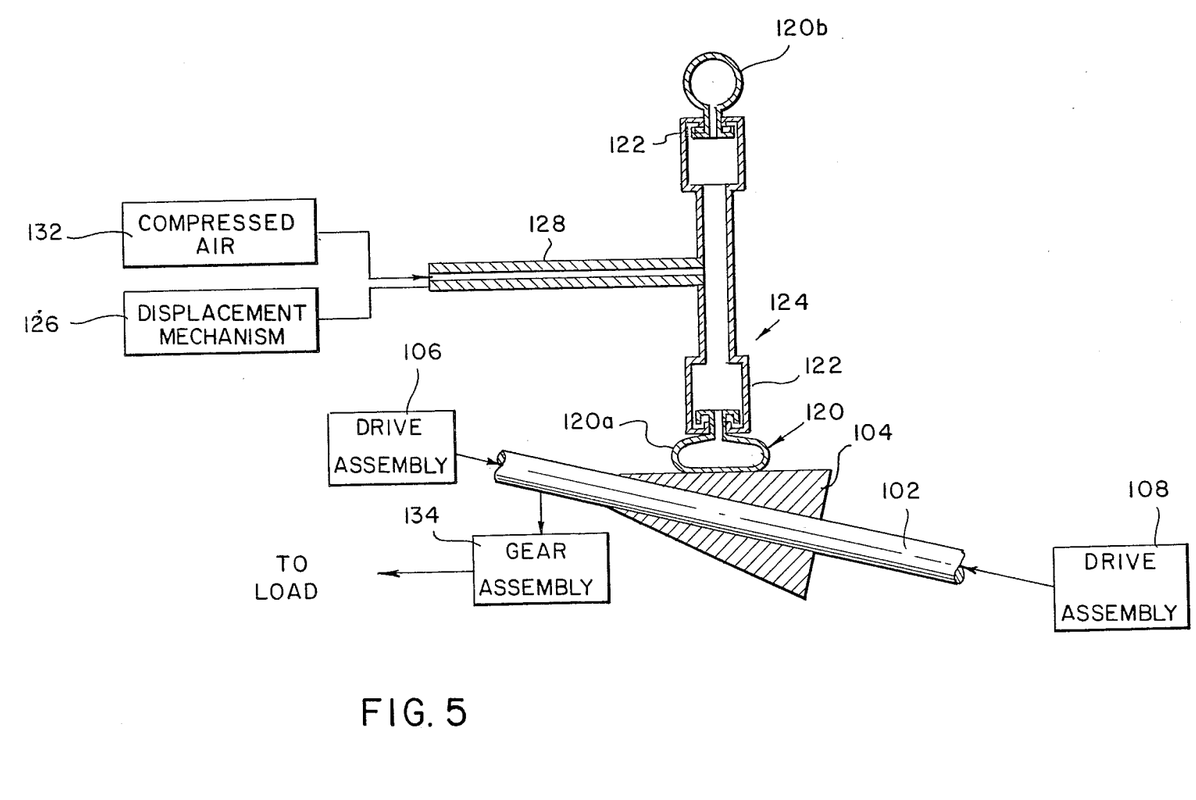
FIG. 5 is a partial sectional view of an alternate embodiment of a nutating cone transmission wherein the cone nutates externally of a flexible speed control ring.

As in the embodiment of FIG. 1, the cone 104 is mounted on an axle 102, with the ends of the axle being driven by bearing drive assemblies 106, 108 through circles to establish nutational movement of the cone. The cone moves about the flexible control ring 120 which has the configuration of a conventional tire. The ring 120 is mounted on a mounting assembly 122 to define the ring and ring mount assembly 124. A displacement mechanism 126 laterally displaces the assembly 124 relative to the orbiting cone to control the speed of rotation of the cone about its axis. A source of compressed air 132 is connected with the interior of the ring mount 122 and thus the interior of the ring 120 via a rigid tube 128 to control the pressure within the ring. Rotation of the cone 104 and its axle 102 is used to drive a gear assembly 134 to drive a load.

The external orbit of the cone 104 relative to the flexible pneumatic speed control ring 120 is successful for two reasons.

First, a significant area of contact between the surfaces of the cone and the pneumatic speed control ring results from significant indentation that the cone makes into the tire portion 120a of the ring under quasi-static conditions. More particularly, the normal force, and hence the tangential traction, between the ring and the cone is proportional to the product of the air pressure within the ring with the surface area. Thus, the cone axle 102 must be mounted so that the cone is sufficiently depressed into the tire at low nutation rates, thereby yielding the required surface area of contact. Thus, if the cone axle is designed with sufficient rigidity, for all nutation rates of interest the deflection of the cone due to centrifugal force will be only a small percentage of the indentation that the cone makes into the tire at low speeds.

Second, the pressure with the flexible ring increases with an increasing nutation rate of the cone, owing to the following factors.

(1) Recovery Time Opposite the Cone

When the cone passes a certain region 120a of the tire, thereby depressing and releasing it, a non-negligible amount of time is required for that region of the tire to spring back to its normal or rest position 120b at a position remote from the cone. There is less time available for such a recovery as the cone passes by at progressively higher frequencies. Thus, the tire is squashed down progressively more in the regions remote from the cone. Given an ideal, infinitely rigid cone axle, the limiting case as the nutation rate increases without limit is that the tire is uniformly indented around its full circumference.

(2) The Isoperimetric Problem

For a radial cross-section of the tire remote from the cone, the more this cross-section is deformed relative to its normal configuration (i.e. a circle) the less its area becomes.

(3) Shift of Centroid

The deformed cross-section of the ring is not only losing surface area as it is depressed from being a circle. For the present case of a cone orbiting outside tire, the inner edge of this cross-section (i.e., the edge closest to the center of the tire/wheel assembly and hence the axis of nutation) is rigid, whereas the outer edge is being pushed inwardly towards the axis of nutation. This means that the geometric centroid of the cross-section is also being pushed inwardly toward the axis of nutation.

The volume of the flexible ring or tire is obtained by integrating (with respect to Haar measure "$d\theta$" about the wheel) the arithmetic product of the cross-sectional area of the tire with the distance between the centroid of the cross-section and the center of the tire (i.e, the axis of nutation). But factors (2) and (3) above indicate that both items in the arithmetic product are decreasing, and factor (1) indicates that the decreases are each progressively greater with increased nutation rate. Thus (1)–(3) above now indicate that the total volume internal to the tire can be expected to decrease as the nutation rate increases.

(4) Ideal Gas Equation: $p \cdot V = \eta \cdot R \cdot T$

Here, p denotes pressure, V denotes volume, $\eta$ denotes total gas molecule count in the containing chamber, T denotes temperature on an absolute scale (i.e., a scale referenced to the absolute zero heat energy point, such as the Kelvin and Rankine scales), and R is a scale factor/constant of proportionality known as the universal gas constant. The present situation has plenty of air circulation inside the tire, by virtue of the nutation of the cone. Furthermore, there is a metal wheel to absorb any generated heat. All told, at least in the short run, one can expect T to be essentially constant. As well, the value of the particulate count $\eta$ will stay constant in the short run (the long run changes being losses due to leakage and replenishments due to the air pressure source external to the speed control assembly). This means that the right side of the ideal gas equation is constant in the short run. As a consequence, the short run variations of the pressure will be inversely proportional to those of the volume.

Combining (4) with the consequence of (1)–(3) that volume should decrease as nutation rate increases, the desired result of increased pressure with increased nutation rate is obtained.

Having established the feasibility of the design approach of the embodiment of FIG. 5, its features will be discussed in greater detail. The basic equations of motion for this embodiment are entirely the analogs of the equations set forth above regarding the embodiment of FIG. 1. For example, the transmission ratio for the new design will have a dependence on the displacement $x_s$ of the speed control ring from the vertex of the cone, the dependence being of the form $$a + (b/x_s)$$

for the appropriate choice of the constants a and b (compare with equation (3) above).

The basic two ingredients for the new design are the following analogs of those for FIG. 1.

(i) The drive mechanism is forcing the cone 104 to orbit around the outside of the speed control ring 120, while allowing the cone to revolve freely about the cone axis. In other words, the drive mechanism and technique of cone axle mount determine the position of the cone axis but not the position of the cone about its axis. If the cone is meeting the ring at the narrow end of the cone, the result is that the cone will rotate comparatively rapidly about its axis. If instead the wide end of the cone meets the ring, the cone will rotate comparatively slowly about its axis. This is the same basic description as that given with FIG. 1 for the mechanics of variable transmission ratio.

(ii) Except for consequent distortions of shape, the speed control ring is capable of exactly one motion, that being lateral displacement in either direction parallel to the axis of nutation of the cone. In fact, as per the description accompanying FIG. 2, it is here again the property that the sidewalls of the tire can bend selectively (vis-a-vis air pressure and cone traction) which will allow the speed control ring to shift as the cone nutates.

With the feasibility and the basic operation of the design in FIG. 5 now established, this design will be compared with that in FIG. 1 by weighing some disadvantages against one critical advantage. One disadvantage is reflected in the absence in FIG. 5 of any method to purge the tire of moisture condensation. Without the wheel at the bottom, one no longer has a convenient rigid tray to catch the condensate, but instead a cup that is bouncing up and down during normal operation. Thus, it might be necessary to resort to a retractable hose together with a purge cycle during start-up and/or shutdown. This disadvantage is one of several in a common category for FIG. 5, that category being the bulk of the design. Neglecting such practical advantages as parts availability (i.e., the fact that the tire in FIG. 5 is conventional whereas the tire in FIG. 1 is custom made) the monumental advantage is as follows. For all the area required in FIG. 5 to have one cone orbiting around the speed control ring, one might just as well have two cones orbiting at a separation of 180°. In fact, whereas the geometry of the design guarantees room for only two cones in general, the reality of a particular design instance may instead permit three or more cones at equal angular spacings. The limit for a particular design instance will be determined by the maximum width of each cone at its base. With more cones, there will be more surface area of contact with the tire, whereby significantly greater torque capacity will be achieved.

The discussion of the design in FIG. 5 will now conclude with some details on the isoperimetric problem. Consider the family of all closed, non-self-intersecting curves of a common length l. The curves are also required to be smooth except perhaps for a finite number of corner points. Thus, after scaling to achieve perimeter equal to 1, a configuration of letter "D" is acceptable, whereas a figure "8" is not since it is self-intersecting and a letter "U" is not since it is open at the top. The isoperimetric problem asks whether there is an upper bound to the areas enclosed by these curves and, if so, whether there is a particular curve that encloses that maximal area. The answer to both questions is affirmative. In fact, the unique curve enclosing the maximal area is the circle of perimeter 1. Thus, all the other curves of length 1 enclose strictly less area than the circle.

The above discussion gives the full extent of the classic treatment of the isoperimetric problem. In the present context, however, the indented portions of the tire are remote from the (approximately) circular shapes of the unindented portions. This raises the need for a more detailed treatment of several questions, such as the following. Is the area monotonically decreasing as the shape moves farther away from the circle? Accordingly, assume that every cross-section of the tire can be closely fit to an ellipse. In particular, the derivative will be computed of the elliptic area with respect to the semi-axis.

Parameterize the generic ellipse as $$\{(a \cdot cos(\psi), b \cdot sin(\psi)) : \psi \in [0, 2\pi[\},$$

where the positive real numbers a and b are the semi-axes of the ellipse. Now integrate the differential form of the Pythagorean theorem, which is $$ds = [(dx)^2 + (dy)^2]^{(\frac{1}{2})}$$

where s is elliptic arc length and (x, y) is the generic point on the ellipse in cartesian coordinates. With the change of variables $$x = a \cdot cos(\psi)$$

and $$y = b \cdot sin(\psi)$$

one now gets the length of the ellipse as $$l = \int_{[0, 2\pi]} (a^2 \cdot sin^2(\psi) + b^2 \cdot cos^2(\psi))^{(\frac{1}{2})} \, d\lambda(\psi) \quad (5)$$

where "$\lambda$" denotes Lebesgue measure. Now, the right side of equation (5) is a continuous, strictly increasing function of each of a and b when the other is held fixed (and both have positive real values). This observation can be combined with the fact that equation (5) is solved by pairs $$(a,b) = (l/4, 0)$$

and $$(a,b) = (0, l/4)$$

to give the following result. For each $b \in [0, l/4]$, equation (5) determines a from the same interval, and in fact determines a as a strictly decreasing function of b. With the derivative of the right side of equation (5) with respect to a being positive for $a \in ]0, l/4[$ and $b > 0$, one can now invoke the implicit function theorem for functions of several complex variables to get the following improved result. For each $b \in ]0, l/4[$, the functional dependence a(b) determined by equation (5) is analytic in b (i.e., has a convergent Taylor's series expansion). Therefore, equation (5) can be differentiated with respect to b with a treated as an implicit function of b. The result can be solved for a'(b) as follows:

$$a'(b) = -\frac{\int_{[0, 2\pi]} \frac{b \cdot cos^2(\psi)}{(a^2 \cdot sin^2(\psi) + b^2 \cdot cos^2(\psi))^{(\frac{1}{2})}} d\lambda(\psi)}{\int_{[0, 2\pi]} \frac{a \cdot sin^2(\psi)}{(a^2 \cdot sin^2(\psi) + b^2 \cdot cos^2(\psi))^{(\frac{1}{2})}} d\lambda(\psi)} \quad (6)$$

This last equation is the principal result that is needed from the given that the family of ellipses in question have common perimeter 1.

Next, compute the area of the generic ellipse bu introducing the change of variables.

$$x = a \cdot \xi \cdot cos(\psi)$$

and $$y = b \cdot \xi \cdot sin(\psi)$$

at $$\psi \in [0, 1]$$

and $$\psi \in [0, 2\pi].$$

This change of variables has Jacobian transformation $a \cdot b \cdot \xi$. Accordingly, the area of the ellipse is obtained as $$\text{Area}(a, b) = \iint_{\text{Ellipse}} \text{``}dx \cdot dy\text{''}$$

$$= \int_{[0, 2\pi]} \int_{[0, 1]} a \cdot b \cdot \xi \, d\lambda(\xi) \, d\lambda(\psi),$$

which is to say that $$\text{Area}(a, b) = \pi \cdot a \cdot b \quad (7)$$

Finally, modify equation (7) as follows. Restrict a to the functional dependence a(b) which was proven to exist in connection with equation (5) above and the isoperimetric condition. Then differentiate the resulting function of b with respect to b, taking advantage of equation (6) above to eliminate a'(b) from the derivative. The result is as follows:

$$\frac{d}{db} \text{Area}(a(b), b) = \pi \cdot a'(b) \cdot b + \pi \cdot a(b) = \quad (8)$$

$$\pi \cdot \frac{\int_{[0, 2\pi]} \frac{a^2 \cdot sin^2(\psi) - b^2 \cdot cos^2(\psi)}{(a^2 \cdot sin^2(\psi) + b^2 \cdot cos^2(\psi))^{(\frac{1}{2})}} d\lambda(\psi)}{\int_{[0, 2\pi]} \frac{a \cdot sin^2(\psi)}{(a^2 \cdot sin^2(\psi) + b^2 \cdot cos^2(\psi))^{(\frac{1}{2})}} d\lambda(\psi)}$$

To get a qualitative assessment of the variation of Area(a(b), b) from this derivative, all that is needed is to determine its algebraic sign for the various possible ordinal relations between a(b) and b. Clearly, the integral in the denominator of the right side of equation (8) is positive for a and b both positive, so that the algebraic sign of the right side is determined by the integral in the numerator. Henceforth call this latter integral $Num_8$ to suggest its role in the numerator on the right side of equation (8)). The steps for the computation of $Num_8$ into a power series will be as follows.

Modify the integrand by using the double angle formulae for the sine and cosine functions, together with some basic algebraic manipulations.

Expand the square root in the denominator of the integrand by using the (binomial) power series that $$(1 - \zeta)^{(-\frac{1}{2})} = \sum_{n=0}^{\infty} \binom{2n}{n} \cdot (\zeta/4)^n$$

which is valid for all complex numbers $\zeta$ having $|\zeta| < 1$.

Interchange the orders of integration and infinite summation, as can be justified in the present case by a straightforward application of Lebesgue's dominated convergence theorem.

Evaluate each integral under the summation sign by using the facts that $$\int_{[0, 2\pi]} \cos^n(2\psi)\, d\lambda(\psi) = 0 \ @ \ n \text{ an odd positive integer}$$

and that $$\int_{[0, 2\pi]} \cos^n(2\psi)\, d\lambda(\psi) = \binom{2m}{m} \cdot 4^{-m} \cdot 2\pi$$

at $=2m$ an even non-negative integer.

These recipes are readily verified using integration by parts and mathematical induction.

Perform various algebraic manipulations to achieve a desirable final form.

The equations corresponding with these five computational procedures are as follow.

$$\text{Num}_8(a,b) = [a^2 - b^2] \cdot [2 \cdot (a^2 + b^2)]^{(-\frac{1}{2})}.$$

$$\int_{[0, 2\pi]} \frac{1 - \frac{a^2 + b^2}{a^2 - b^2} \cdot \cos(2\psi)}{\left(1 - \frac{a^2 - b^2}{a^2 + b^2} \cdot \cos(2\psi)\right)^{(\frac{1}{2})}} d\lambda(\psi) =$$

$$(a^2 - b^2) \cdot (2 \cdot (a^2 + b^2))^{(-\frac{1}{2})} \cdot$$

$$\int_{[0, 2\pi]} \left(1 - \frac{a^2 + b^2}{a^2 - b^2} \cdot \cos(2\psi)\right) \cdot$$

$$\sum_{n=0}^{\infty} \binom{2n}{n} \cdot \left(\frac{1}{4} - \frac{a^2 - b^2}{a^2 + b^2} \cdot \cos(2\psi)\right)^n d\lambda(\psi) =$$

$$(a^2 - b^2) \cdot (2 \cdot (a^2 + b^2))^{(-\frac{1}{2})} \cdot$$

$$\sum_{n=0}^{\infty} \left(\frac{a^2 - b^2}{a^2 + b^2}\right)^n \cdot$$

$$\int_{[0, 2\pi]} \left(\binom{2n}{n} \cdot 4^{-n} \cdot \cos^n(2\psi) - \right.$$

$$\left. \binom{2n+2}{n+1} \cdot 4^{-n-1} \cdot \cos^{n+2}(2\psi)\right) d\lambda(\psi) =$$

$$(a^2 - b^2) \cdot (2 \cdot (a^2 + b^2))^{(-\frac{1}{2})} \cdot$$

$$\sum_{n=0}^{\infty} \left(\frac{a^2 - b^2}{a^2 + b^2}\right)^{2n}.$$

$$\left(\binom{4n}{2n} \cdot 4^{-2n} \cdot \binom{2n}{n} \cdot 4^{-n} \cdot 2\pi - \right.$$

$$\left. \binom{4n+2}{2n+1} \cdot 4^{-2n-1} \cdot \binom{2n+2}{n+1} \cdot 4^{-n-1} \cdot 2\pi\right) =$$

$$(a^2 - b^2) \cdot (2 \cdot (a^2 + b^2))^{(-\frac{1}{2})} \cdot$$

$$\sum_{n=0}^{\infty} \left(\frac{a^2 - b^2}{a^2 + b^2}\right)^{2n}.$$

$$\binom{4n}{2n} \cdot \binom{2n}{n} \cdot 4^{-3n} \cdot 2\pi \cdot \frac{3}{4n + 4}$$

This latter formulation of Num$_8$ can be described as follows. It is the arithmetic product of the factor $$a^2 - b^2$$

and of another factor which is a function of a and b that is strictly positive whenever a > 0 and b > 0. But, as has already been noted above, it is this numerator of equation (8) which determines the algebraic sign of the right side of equation (8), and therefore that right side is now subject to the same generic description as an arithmetic product. The conclusion is as follows:

$$\frac{d}{db} \text{Area}(a(b), b) \begin{cases} >0 & \text{if } 0 < b < l/(2\pi) \\ & \text{(whereby } b < a(b)) \\ =0 & \text{if } b = l/(2\pi) \\ & \text{(whereby } b = a(b)) \\ <0 & \text{if } l/(2\pi) < b < l/4 \\ & \text{(whereby } 0 < a(b) < b) \end{cases}$$

In light of the mean value theorem, the following conclusion is reached. As b increases from 0, the ellipse starts from the fully squashed state of 0 area and then strictly increases in area. This increase of area continues as long as b < a(b) (i.e., b is the semi-minor axis and a(b) is the semi-major axis). Once b=a(b), the maximal area is attained, specifically at the case that the ellipse has become a circle. Further increases in b result in strict decreases in the area of the ellipse, until the ellipse is again squashed flat at a(b)=0. This decrease of area is the symmetric reflection of the previous increase, now that instead b>a(b) (i.e., b is now the semi-major axis and a is the semi-minor axis).

This discussion of the isoperimetric problem is sufficient assuming that every cross-section of the tire can be closely fit to an ellipse and that remote from the cone, the tire cross-section has a rest shape approximately a circle.

Since the improved rings of the present invention are flexible, damage to the ring or cone from particulates is unlikely. In fact, the only element of the nutating cone transmission which is subject to wear is the flexible ring. As set forth above, this wear can be compensated for by increasing the pressure within the ring, following which the ring can be easily removed and replaced. Since there is no metal to metal contact between the ring and cone, friction, heat buildup and noise generation are minimized. Any heat which does result is easily dissipated via air cooling.

While in accordance with the provisions of the patent statutes the preferred forms and embodiments have been illustrated and described, it will be apparent to those skilled in the art that various changes or modifications may be made without deviating from the inventive concepts set forth above.

What is claimed is:

1. In a nutating cone drive assembly including a driven input assembly having a first axis, an output assembly, and a nutating cone having an axis arranged at an angle relative to the first axis for transferring drive from the input assembly to the output assembly and the cone has a vertex and a base, the improvement which comprises
   (a) flexible speed control ring means formed of synthetic rubber material and having a configuration of a reversely folded tire, said speed control ring means controlling rotational speed of the cone about its axis in response to the nutational drive of the cone imparted by the input assembly;
   (b) means having a configuration of an annular wheel rim for mounting said speed control ring means about the cone with an inner surface of said speed control ring means in contact with and depressed by a surface of the cone;
   (c) means for supplying pressurized gas to an interior of said speed control ring means, whereby said ring means returns to its normal configuration when out of contact with the cone, and further whereby the traction of said ring means relative to the cone is varied in accordance with the pressure within said ring means;
   (d) means connected with said mounting means for removing condensation from the interior of said ring means; and
   (e) means for laterally displacing said speed control ring means relative to the cone in a direction parallel with the first axis while preventing rotational movement of said ring means and slippage between said ring means and the cone, whereby when said ring means is displaced toward the vertex of the cone, the speed of rotation of the cone increases along with a ratio of a radius of said ring means to the radius of a conic circle of contact, thus reducing the drive at the output assembly and when said ring means is displaced toward the base of the cone, the speed of rotation of the cone decreases along with the ratio of the radius of said ring means to the radius of the conic circle of contact to increase the drive at the output assembly.

2. Apparatus as defined in claim 1, wherein said ring means comprises a horizontal bar tread design for contact with the cone surface.

3. Apparatus as defined in claim 2, and further comprising a roller pincer mechanism connected with said input assembly and surrounding said ring means for compressing the side wall portions of said ring means to assist the return of said ring means to its normal configuration when out of contact with the cone.

4. In a nutating cone drive assembly including a driven input assembly having a first axis, an output assembly, and a nutating cone having an axis arranged at an angle relative to the first axis for transferring drive from the input assembly to the output assembly and the cone has a vertex and a base.
   the improvement which comprises
   (a) flexible speed control ring means for controlling rotational speed of the cone about its axis in response to the nutational drive of the cone imparted by the input assembly;
   (b) means for mounting said speed control ring means adjacent to the cone, with a portion of said ring means being in contact with and depressed by a surface of the cone;
   (c) means for laterally displacing said speed control ring means relative to the cone in a direction parallel with the first axis while preventing rotational movement of said ring means and slippage between said ring means and the cone; and
   (d) means for tilting said ring means in the direction of lateral displacement while simultaneously preventing sliding movement of said ring means relative to the cone, whereby when said ring means is displaced toward the vertex of the cone, the speed of rotation of the cone increases along with a ratio of a radius of said ring means to the radius of a conic circle of contact, thus reducing the drive at the output assembly and when said ring means is displaced toward the base of the cone, the speed of rotation of the cone decreases along with the ratio of the radius of said ring means to the radius of the conic circle of contact to increase the drive at the output assembly.

5. In a nutating cone drive assembly including a driven input assembly having a first axis, an output assembly, and a nutating cone having an axis arranged at an angle relative to the first axis for transferring drive from the input assembly to the output assembly and the cone vertex and a base,
   the improvement which comprises
   (a) flexible speed control ring means formed of synthetic rubber material for controlling rotational speed of the cone about its axis in response to the nutational drive of the cone imparted by the input assembly;
   (b) means for mounting said speed control ring means adjacent to the cone, with a portion of said ring means being in contact with and depressed by a surface of the cone, said mounting means having a configuration of an annular wheel rim and said speed control ring means having a configuration of a tire, the cone orbiting an outer surface of said speed control ring means;
   (c) means for supplying pressurized gas to an interior of said speed control ring means, whereby said ring means returns to its normal configuration when out of contact with the cone, and further whereby traction of said ring means relative to the cone is varied in accordance with a pressure within said ring means; and
   (d) means for laterally displacing said speed control ring means relative to the cone in a direction parallel with the first axis while preventing rotational movement of said ring means and slippage between said ring means and the cone, whereby when said ring means is displaced toward the vertex of the cone, the speed of rotation of the cone increases along with the ratio of the radius of said ring means to a radius of a conic circle contact, thus reducing a drive at the output assembly, and when said ring means is displaced toward the base of the cone, the speed of rotation of the cone decreases along with the ratio of the radius of said ring means to the radius of the conic circle of contact to increase the drive at the output assembly.

* * * * *